March 30, 1937.                J. S. COLDWELL                2,075,271
                           WHEEL FOR ROLLER SKATES
                              Filed Feb. 23, 1935
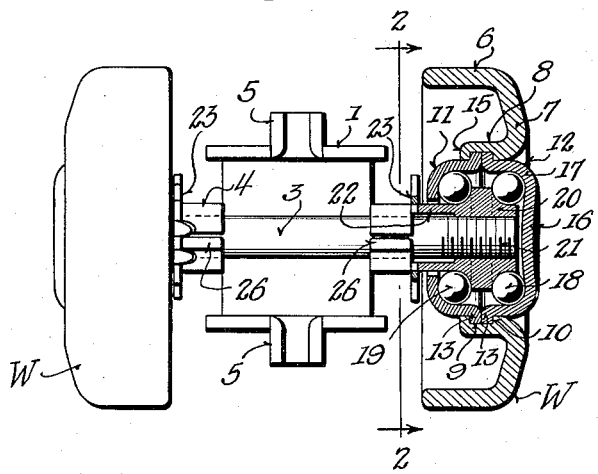
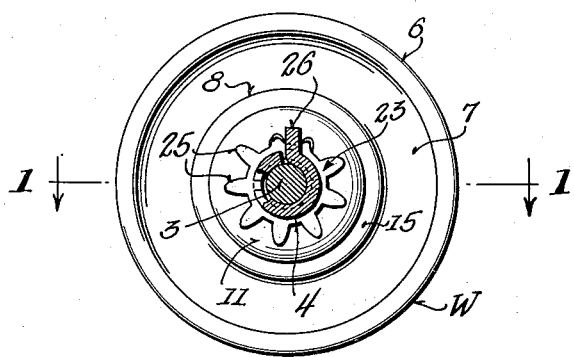
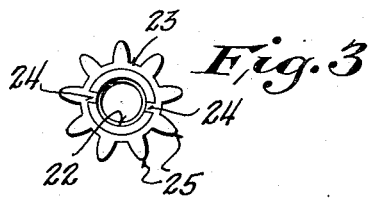
INVENTOR
John S. Coldwell
BY
ATTORNEY.

Patented Mar. 30, 1937

2,075,271

UNITED STATES PATENT OFFICE 2,075,271

WHEEL FOR ROLLER SKATES

John S. Coldwell, Milwaukee, Wis., assignor, by mesne assignments, to Globe-Union Inc., Milwaukee, Wis., a corporation of Delaware Application February 23, 1935, Serial No. 7,811

13 Claims. (Cl. 208—181)

This invention relates to an improvement in wheels and wheel and axle assemblies especially adapted for use with roller skates.

One of the greatest troubles with all roller skates is that the nuts come loose and the wheels come off. Another objection is that the heads of the bolts and the nuts stick out to such an extent that they strike passing objects or even the skater's ankles.

One object of the present invention is to provide a wheel and axle assembly in which the wheels are positively prevented from coming off the axles, in which there are no nuts sticking out, and wherein these advantages are realized with a minimum number of parts and in such manner as to facilitate assembly.

Another object of the invention is to enhance the appearance of the wheel especially to adapt it for use in a roller skate of streamline design.

A further object is to provide a device of this character of simple, durable and compact construction, susceptible of convenient and economical production in quantity and which provides in use a smooth free running wheel, highly satisfactory in all respects.

As indicated, one of the salient features of the invention is the omission of the conventional nut for holding the wheel on the axle. In lieu of such a nut, the bearing cone or inner bearing member is threaded to the axle and in the assembly is held against turning. While the cone may be held against turning in various ways, preferably a star washer is fixed to the inner end of the bearing cone and has bendable locking fingers adapted to be bent into locking engagement with a projection on the wheel truck which carries the axle. The star washer is also employed to facilitate assembly and disassembly, as will hereinafter more clearly appear.

By virtue of such a construction, it is feasible and practical to use an outer ball bearing cup which has an imperforate body portion and so exclude dust as well as enhance the appearance of the wheel.

Other objects and advantages reside in certain novel features of the construction, arrangement and combination of parts which will be hereinafter more fully described and particularly pointed out in the appended claims, reference being had in the accompanying drawing, forming a part of this specification, and in which:

Figure 1 is a view partly in top plan and partly in horizontal section taken on line 1—1 of Figure 2 and showing a wheel and axle assembly embodying the invention;

Figure 2 is a view in vertical cross section taken on line 2—2 of Figure 1; and

Figure 3 is a detail view in elevation showing how the star washer is combined with the bearing cone.

Referring to the drawing, the numeral 1 designates a wheel truck to which an axle 3 is secured. Integral extensions 4 on the wheel truck are securely wrapped about the portions of the axle to fasten it in position on the wheel truck. The truck is shown as having trunnions 5 which rockably interfit with brackets (not shown) in the assembly. The general structure of the skate is fully described and claimed in my application filed February 23, 1935, Serial No. 7,812, for Roller skates.

The ends of the axle beyond the extension 4 have wheels designated generally at W mounted thereon. While one wheel construction is shown and described in detail, it is to be understood that the invention is not limited to the particular wheel structure disclosed. Many of the advantages of the present invention may be realized with any conventional roller skate wheel of any tread or bearing construction. For example, conventional fiber wheels or plain bearing wheels with no ball bearings may be employed. However, the wheels shown have a number of special advantages.

The wheels described are of identical construction and a single description will serve for both. As illustrated, each wheel has a tread 6 formed integral with the wheel body 7. The wheel body 7 is provided at its inner edge with an inturned flange 8, a portion of which is of reduced cross section as indicated at 9. At the point where the flange 8 is reduced a shoulder 10 is presented.

Ball bearing retaining cups 11 and 12 are provided and have outwardly directed flanges 13 which abut against each other and engage on the reduced portion of the flange 8 and against the shoulder 10 in the assembly. After the parts have been assembled an edge portion of the reduced part of the flange 8 is crimped or bent over as indicated at 14.

It will be noted that the outer bearing cup 12 has its body portion 16 continuous or imperforate so as to exclude dust. It is also provided with what is, in effect, an annular groove 17 adjacent its periphery in order to aid in locating its row of ball bearings 18 and thus facilitate assembly. In addition to the ball bearings 18 there is an inner row of ball bearings 19. The ball bearings 18 and 19 operate in raceways defined by the cups 11 and 12 and a double bearing cone 20, which constitutes the inner bearing member of the wheel. The cone 20 is threaded on its end of the axle as indicated at 21. The hub of the cone is extended as at 22 and to this extension a star washer 23 is appropriately secured and keyed, as indicated at 24. The washer 23 presents a number of locking fingers 25 which are bendable out of the plane of the washer and into engagement with the projections 26 provided on the wheel truck. When the fingers are bent into engagement with the projections 26 they prevent the bearing cone from turning and thus hold it in proper position on its axle.

In practice, the wheel is first assembled and then a star washer 23 is pressed over the end of the bearing cone 20 to cause its key 24 to engage in the key slot in the outer end of the cone. The cone and threaded end of the axle are then brought into engagement. It will be noted that the star washer is made in the form of a gear and this makes it practical to bring it into engagement with a gear and thread the wheel up tight on the end of the axle, after which one or more of the locking fingers 25 are bent into engagement with the projection 26 on the wheel truck. For replacement of the wheel, the locking fingers are first straightened out. The star washer 23 may then be gripped with a pair of pliers and the wheels unscrewed from the end of the axle. From this it is apparent that an important advantage of the invention in this particular is that the star washer 23 may be used as a driving means for threading the cone on the end of the axle after the wheel has been assembled. It also facilitates disassembly.

The construction described makes it practical and convenient to omit the nut ordinarily employed for holding a roller skate wheel on its axle and hence makes it possible to employ the imperforate outer bearing cup 12 whereby to enhance the appearance of the skate, exclude dust in the bearings, and, in general, improve the structure.

A skate constructed in accordance with the present invention is simple, compact and durable, and in use is free running and entirely satisfactory in all respects.

While I have shown and described one construction in which the invention may be advantageously embodied, it is to be understood that this construction has been selected merely for the purpose of illustration or example and that various changes in the size, shape and arrangement of the parts may be made without departing from the spirit of the invention or the scope of the subjoined claims.

The invention claimed is:

1. In combination, a wheel comprising a tread and a wheel body extending inwardly from the tread, ball bearing retaining cups secured to the wheel body, the outer one of said cups having an imperforate body portion to exclude dust, rows of ball bearings in said cups, a bearing cone for said ball bearings, an axle on which said bearing cone is threaded, and means for preventing said bearing cone from turning.

2. In combination, a wheel comprising a tread and a wheel body extending inwardly from the tread, ball bearing retaining cups secured to the wheel body, the outer one of said cups having an imperforate body portion to exclude dust, rows of ball bearings in said cups, a bearing cone for said ball bearings, an axle on which said bearing cone is threaded, and a star washer fixedly interrelated with said cone and having a plurality of locking fingers adapted to be bent into locking engagement with a stationary part to hold the cone against turning.

3. In combination, a wheel comprising a tread and a wheel body extending inwardly from the tread, ball bearing retaining cups secured to the wheel body, the outer one of said cups having an imperforate body portion to exclude dust, rows of ball bearings in said cups, a bearing cone for said ball bearings, an axle on which said bearing cone is mounted, and means for fixing the cone to the axle and thereby maintain the assembly.

4. In combination, a wheel comprising a tread and a wheel body extending inwardly from the tread, ball bearing retaining cups secured to the wheel body, the outer one of said cups having an imperforate body portion to exclude dust, rows of ball bearings in said cups, a bearing cone for said ball bearings, an axle on which said bearing cone is threaded, and means to prevent said bearing cone from turning, said outer bearing cup having an annular groove at the periphery of its body portion adapted to locate its row of ball bearings and facilitate assembly.

5. In combination, a wheel comprising a tread and a wheel body extending inwardly from the tread, ball bearing retaining cups secured to the wheel body, the outer one of said cups having an imperforate body portion to exclude dust, rows of ball bearings in said cups, a bearing cone for said ball bearings, an axle on which said bearing cone is threaded, a wheel truck to which the axle is fixed, and a star washer fixedly interconnected with the cone and having a plurality of bendable locking fingers, said wheel truck having a projection with which the fingers are engageable to secure the cone against turning.

6. In combination, a wheel comprising a tread and a wheel body extending inwardly from the tread, a ball bearing cup interconnected with the wheel body, ball bearings in said cup, a bearing cone coacting with the cup to define a raceway for the ball bearings, an axle on which the cone is threaded and means to prevent said bearing cone from turning.

7. In combination, a wheel comprising a tread and a wheel body extending inwardly from the tread, ball bearing retaining cups secured to the wheel body, a bearing cone for said ball bearings, an axle on which said bearing cone is threaded, and means for preventing said bearing cone from turning.

8. In combination, a wheel comprising a tread and a wheel body extending inwardly from the tread, a ball bearing cup interconnected with the wheel body, ball bearings in said cup, said cup having an imperforate body portion to exclude dust, a bearing cone coacting with the cup to define a raceway for the ball bearings, an axle on which the cone is threaded and means to prevent said bearing cone from turning.

9. A device of the character described comprising a wheel having a tread and a body portion, an axle, ball bearings, ball bearing cups and a bearing cone operatively related to each other and to the wheel body and axle and further characterized in that the outer bearing cup has an imperforate body portion to exclude dust.

10. A device of the character described comprising a wheel having a tread and a body portion, an axle, ball bearings, ball bearing cups and a bearing cone operatively related to each other and to the wheel body and axle and further characterized in that the outer bearing cup has an imperforate body portion to exclude dust and that means cooperable with the inner portion of the bearing cone maintains the assembly on the axle.

11. A device of the character described comprising a wheel, an axle, an inner bearing member operatively related to the wheel and threaded on the axle, and a star washer connected to the inner bearing member and adapted to facilitate assembly and to hold the bearing member against turning in the assembly.

12. A device of the character described comprising an axle, a wheel, a bearing structure between the wheel and the axle having a single inner bearing member threaded on the axle, and means engaged with the inner end of the inner bearing member to hold said inner bearing member against turning.

13. A device of the character described comprising an axle, a self-contained and unitary wheel and anti-friction bearing structure adapted to be applied to and removed from the axle as a unit, said structure having an inner bearing member threaded to the axle in the assembly, and means coacting with the inner end portion of the inner bearing member for holding it against rotation when the parts are assembled.

JOHN S. COLDWELL.